United States Patent [19]
Smith et al.
[11] Patent Number: 4,902,374
[45] Date of Patent: Feb. 20, 1990

[54] BAG MAKING MACHINE

[75] Inventors: David A. Smith, Midland; Herbert B. Geiger, Bay City; R. Douglas Behr, Midland, all of Mich.
[73] Assignee: The Dow Chemical Company, Midland, Mich.

[21] Appl. No.: 188,884
[22] Filed: May 2, 1988
[51] Int. Cl.[4] ........................ B23B 31/00; F16H 55/48; F16G 1/28
[52] U.S. Cl. .................................... 156/515; 156/251; 493/194; 493/203; 493/205; 493/208; 74/569
[58] Field of Search ..................... 156/515, 583.5, 251; 493/194, 199, 203, 204, 205, 208, 206, 235; 74/568 R, 567, 569, 10.35

[56] References Cited

U.S. PATENT DOCUMENTS

| | | | |
|---|---|---|---|
| 2,598,427 | 5/1952 | Place | 74/568 |
| 3,004,881 | 10/1961 | van der Muelen . | |
| 3,372,708 | 3/1968 | Hotchkin | 74/568 X |
| 3,838,631 | 10/1974 | Simpson et al. . | |
| 3,867,873 | 2/1975 | Simpson et al. . | |
| 3,901,754 | 8/1975 | Simpson et al. . | |
| 3,971,299 | 7/1976 | Whittle et al. . | |
| 4,115,183 | 9/1978 | Achelpohl et al. | 156/583.5 X |
| 4,198,259 | 4/1980 | van der Muelen . | |
| 4,331,502 | 5/1982 | Achelpohl et al. . | |
| 4,464,217 | 8/1984 | Dickover et al. | 156/229 |
| 4,557,713 | 12/1985 | Savich . | |
| 4,609,367 | 9/1986 | Savich et al. | 156/515 X |
| 4,702,731 | 10/1987 | Lambrecht et al. . | |

*Primary Examiner*—David Simmons
*Assistant Examiner*—Gregory J. Wilber

[57] ABSTRACT

A bag making machine and method for the continuous production of bags from a folded web of thermoplastic material is provided. The apparatus includes a capability for making bags of differing widths. The apparatus includes a rotatable drum having a plurality of sever and seal stations for forming individual positioned about the outer periphery of the drum. A source of a continuous folded web of thermoplastic material is also provided, and continuously fed onto the surface of the drum. Means positioned between adjacent sever and seal stations tuck the web of material inwardly from the periphery of the drum.

15 Claims, 3 Drawing Sheets

BAG MAKING MACHINE

BACKGROUND OF THE INVENTION

This invention relates to an apparatus and process for continuously making thermoplastic bags, and more particularly to an apparatus and process capable of producing bags of different widths on the same apparatus.

A wide variety of plastic bag products are commercially available today to enable the consumer to package and protect a variety of food products. Such bags are available in sizes varying from pint size to larger quart, gallon, and jumbo sizes.

Continuous, rotary bag making machines are known in the art. Typically, these machines include a rotating drum having a plurality of sever and seal stations equally spaced about the periphery of the drum. A continuous web of thermoplastic material, folded upon itself in the machine direction to form a "U-folded" web, is fed continuously onto the drum and then to the sever and seal stations.

Generally, clamping assemblies are moved into position over individual sever and seal stations and against the drum periphery to hold the web in position as the drum rotates. During the rotation of the drum, heated wires, carried in recesses within the drum, are caused to move outwardly to sever and seal the web, forming side seams on an individual bag. Typically, a plurality of heated wires are contained within the drum, with one wire being associated with each sever and seal station.

Such bag making machines produce bags which are as deep as the folded web and which are as wide as the spacing between sever and seal stations. In such machines, while the depth of the bags may be readily regulated by cutting the web to width prior to folding, changing the finished bag width is much more difficult. In those apparatuses, it is not possible to change the width of the bags except for severing only at every second or third station around the drum. Consequently, separate machines are required to make each individual size of bag, and machines cannot readily be converted to produce bags of a size different than the machine was originally designed to produce.

Other bag making machines, such as those taught by Achelphol et al, U.S. Pat. Nos. 4,331,502 and 4,115,183, utilize tucking mechanisms to increase production rates on the machines. In these machines, the sever and seal stations are located closely about the periphery of the drum, and a tucking mechanism acts to push the web inwardly into a groove within the periphery of the drum. The depth of the tuck determines the width of the individual bags, with a greater depth of tuck producing a bag of greater width.

Again, however, such machines with tucking mechanisms cannot be easily modified to make bags of a width different than that the machine was designed to do. That is, the tuck mechanisms on such machines are operated by cams which are designed to push the web into a groove a predetermined distance. Such cams may be modified only by disassembling them and recutting the cam controlling the tucking mechanism, or by replacing one cam size with another. Such operations are not only difficult but costly in both labor and downtime of the machines. Moreover, because the tucking operation places stretching forces on the plastic web, the consistency of width of the bags produced by such machines is not good.

More recently, bag making machines have been developed which utilize an outwardly directed tucking mechanism to control the depth of tuck. For example, Savich, U.S. Pat. No. 4,557,713 and Savich et al, U.S. Pat. No. 4,609,367, teach bag making machines which have an outward tucking cam mechanism. A cam, which is adjustable for controlling the depth of truck, is moved in a radial direction to control the tuck depth, and thus, the bag width. Production of different sized bags on such machines is possible.

However, even these more recent machines suffer from problems in achieving bags having a consistent width. Because of the tucks taken in the web, the overall length of the web on the rotating drum is greater than that being fed from the drive rolls at the web source. This requires that the drive rolls be driven faster than the speed of rotation of the drum. Because these machines are typically operated at speeds approaching 300 feet per minute, multiple tucks per second must be made on the drum.

The ability of the speed of the drive rolls to be regulated in the fraction of a second in which a tuck is made is beyond the capabilities of these machines. Thus, the web itself is subjected to instantaneous stretching and acceleration forces several times a second.

Because of these forces, it becomes extremely difficult to control accurately the width of each individual bag as stretching and slippage occur on the rotating drum. Accordingly, there is still a need in the art for a bag making machine which is capable of making bags of differing widths and which is capable of making bags having a consistent width for the particular size bag selected.

SUMMARY OF THE INVENTION

The present invention meets that need by providing a bag making machine and method for the continuous protection of bags from a folded web of thermoplastic material. The apparatus includes a capability for making bags of differing widths as well as making bags having a consistent width for the particular size of bag selected.

In accordance with one aspect of the present invention, an apparatus is provided which includes a rotatable drum having a plurality of sever and seal stations for forming individual bags. The sever and seal stations are positioned about the outer periphery of the drum. A source of a continuous folded web of thermoplastic material is also provided, either directly from a continuous extrusion line or from a storage roll of material. Means such as a pair of drive rolls, for continuously feeding the folded web of thermoplastic material onto the surface of the drum are also included.

The apparatus also includes means secured to individual sever and seal stations and positioned so that the means are located between adjacent sever and seal stations for tucking the web of material inwardly from the periphery of the drum. The amount of inward movement of the tucking means may be controlled to adjust the width of the finished bags. Once the web is severed and sealed, means are provided for transferring individual bags from the drum. Such means may be a transfer drum which is equipped with vacuum ports which transfer the bags off of the product drum. The bags may then be stacked and packaged as is conventional in the art.

In a preferred embodiment of the invention, the tucking means comprises a bar or roll running laterally across the outer surface of the drum and mounted onto a corresponding seal bar assembly in a sever and seal station. A recess in the outer surface of the drum immediately beneath the bar is provided in which the web is tucked. The bar may be actuated by a cam means for translating the bar from a first position above the outer surface of the drum to a second position urging the web into the recess. For example, the cam means may include a cam surface, and a cam follower mounted on a clamp assembly of a sever and seal station which contacts the cam surface. The tucking means is translated in an arc from the first to the second positions. By adjusting the amount of movement of the bar, the amount of tuck, and thus, the final width of the bag may be controlled. This may be accomplished by providing a cam follower which is adjustable with respect to the cam surface, or by providing an adjustable cam surface.

As previously mentioned, the apparatus also includes a plurality of means for clamping the web to the surface of the drum at each of the respective sever and seal stations. The clamping means include a plurality of assemblies secured to an endless conveyor positioned adjacent the sever and seal stations. The endless conveyor is driven from first and second sprockets located on opposite sides of the drum. The clamping assemblies are moved into position to clamp the web during severing of the web by a hot wire element, and then are released.

Accordingly, it is an object of the present invention to provide a bag making machine and process which is capable of making bags of differing widths, and which is capable of making bags having a consistent width for the particular size of bag selected. These and other objects and advantages of the present invention, will become apparent from the following detailed description, the accompanying drawings, and the appended claims.

DESCRIPTION OF THE PREFERRED EMBODIMENTS

Figure 1:
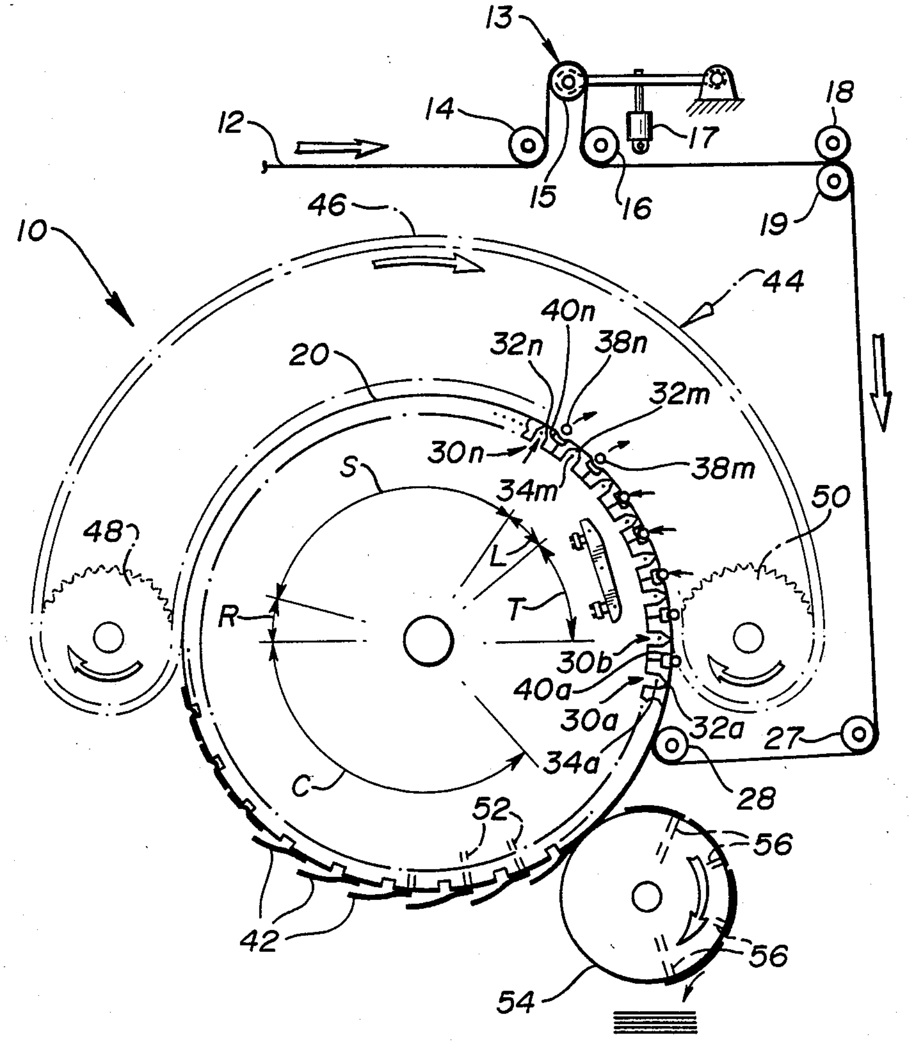
FIG. 1 is a schematic view partially broken away, showing selected components of the bag making apparatus of the present invention.

Referring now to FIG. 1, the bag making machine of the present invention is illustrated in schematic form. Bag making machine 10 receives a continuous folded film web 12 from a spool (not shown) or directly from an extrusion line. Film web 12 may be folded upon itself in the machine direction to form a two ply, "U-folded" web as is conventional.

Film web 12 may be either a zippered or unzippered bag stock, with the width of the film chosen to form a finished bag of desired size. Web 12 is caused to pass through a pneumatically actuated dancer roll assembly 13, having rolls 14,15, and 16, which acts to control the tension on the web based on its vertical positioning. In dancer roll assembly 13, the positions of rolls 14 and 16 are fixed while roll 15 pivots as air cylinder 17 is actuated.

Web 12 is then pulled through a draw roll arrangement 18,19. The draw rolls 18,19 are driven at a surface speed slightly in excess of the rotational surface speed of vacuum product drum 20. This arrangement permits some of the upstream film tension to relax, and it provides the additional film needed for the tucking operation which takes place on vacuum product drum 20. Vacuum product drum 20 is driven by drive means (not shown) in a conventional manner. The film web 12 then passes over roll 27 and a lay-on roll 28 which is located to position the web accurately against the rotating product drum surface.

As the product drum 20 rotates about its axis, film web 12 passes through a number of different zones. These zones are identified by FIG. 1 by the letters S, T, L, R, and C. In each of these zones, various operations are performed on the web in order to make the web into individual bags. The zones include a tucking zone T, a clamping zone L, a sever and seal zone S, a clamp release zone R, and a cooling zone C.

Product drum 20 has a plurality of sever and seal stations located about the outer peripheray thereof and generally indicated at 30*a*–30*n* where individual bags are formed. The actual number of sever and seal stations on a given product drum varies based on the drum diameter and the spacing of the stations. For purposes of description only, it will be assumed that there are n, where n is an integer, such stations with accompanying elements. These sever and seal stations are positioned about the outer periphery of drum 20. The sever and seal stations include heating element slots 32*a*–32*n* in which respective heated wire elements 34*a*–34*n* are positioned and a plurality of seal bar assemblies 36*a*–36*n* (where N is an integer greater than n) which are moved into respective clamping positions during the sever and seal procedure.

Located between each sever and seal station 30 are tucking rolls 38*a*–38*n*. Tucking rolls 38 may be mounted so that film web 12 causes them to rotate as it passes over them. Alternatively, the tucking rolls may be in the form of fixed bars having low surface friction. Each tucking bar or roll 38 is designed to be moved from an initial position above the surface of product drum 20 substantially in an arc inwardly to a position where film web 12 is tucked inwardly into recesses 40*a*–40*n* in the outer surface of product drum 20. Recesses 40 may be machined slots in the drum surface that are substantially parallel to the tucking roll and positioned about midway between adjacent sever and seal stations. Such tucking action occurs in tucking zone T. Once the web 12 is tucked inwardly, a respective seal bar assembly moves into position to clamp the web 12 securely to the drum surface in clamping zone L. The web 12 is then ready for the sever and seal operation. As can be seen, the amount of inward movement of the tucking rolls may be controlled to provide bags having differing widths.

Figure 2A:
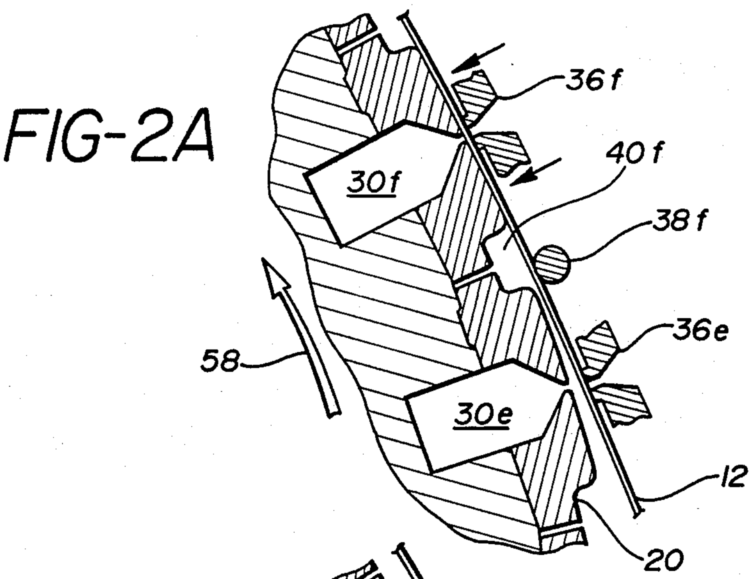
FIGS. 2A, 2B, and 2C illustrate in cross-sectional views on an enlarged scale the operation of the tucking mechanism of the present invention.
Figure 2B:
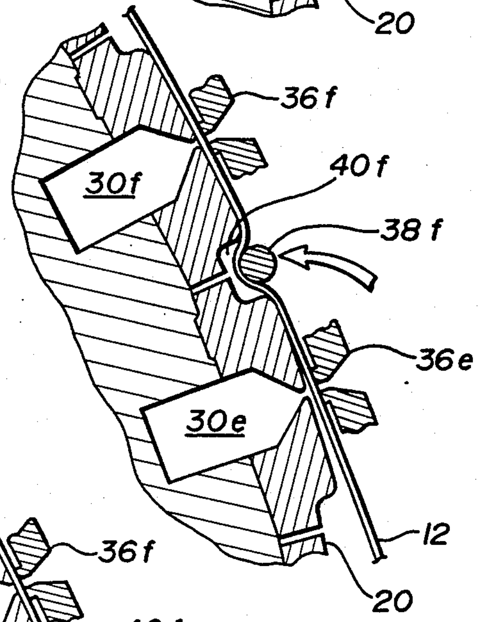
Figure 2C:
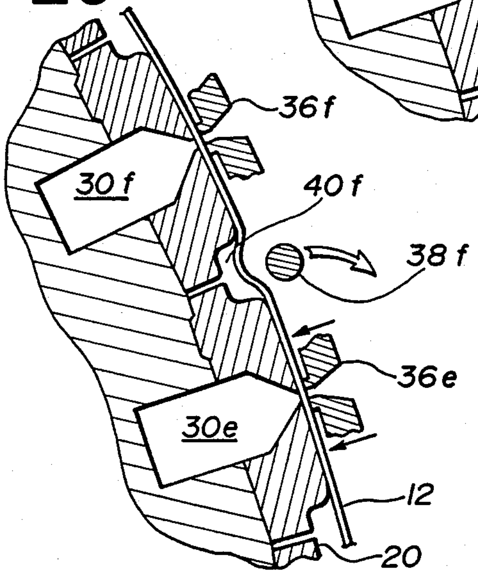

Film web 12 is then severed and sealed at a sever and seal station on product drum 20 in the following manner. As best illustrated in FIGS. 2A–2C, film web 12 is clamped tightly to the outer surface of product drum 20 in clamping zone L at a severing and sealing edge of heating element slot 32*a* by seal bar assembly 36*a*. As vacuum product drum 20 rotates in the direction shown by the arrow in FIG. 2A, a heated wire severing and sealing element (shown in FIG. 1), operable through a cam assembly (not shown), emerges from slot 32*a* in vacuum product drum 20 and severs film web 12. This severing takes place in the sever and seal zone S as shown in FIG. 1.

Once severed, the thermoplastic film melts back to the edge of the seal bar assembly 36, and a bead seal forms on the edge of the bag. Individual flexible bag products 42 are formed by the severing and sealing of portions of web 12 on adjacent seal bar assemblies. Just prior to the release of the clamping force of the seal bar assembly, a vacuum is applied to the bags 42. The vacuum may be applied to the leading edge or both the leading and trailing edges of the bags.

The seal bar assemblies 36*a*–36*n* are disposed on an endless conveyor mechanism 44 extending about the outer periphery of drum 20 from about tucking zone T to about clamp release zone R. Conveyor mechanism 44 may include a continuous chain drive 46 driven by pairs of sprockets 48 and 50, located on opposite sides of drum 20.

Individual plastic bags are held in position on rotating product drum 20 by respective vacuum ports 52 which communicate with a central manifold (not shown). As product drum 20 rotates, vacuum ports 52 are brought into and out of communication with the manifold at proper times during the process. Generally, the vacuum ports are activated to secure the individual bags to the product drum 20 prior to being released in clamp release zone R and are turned off when the bags reach transfer drum 54.

Transfer drum 54, like product drum 20, has a series of vacuum ports 56 which communicate with a central manifold (not shown). The vacuum ports are activated to cause individual bags 42 to be transferred from drum 20 onto drum 54. From drum 54, the bags are then delivered to packaging apparatus as is conventional in the art. For example, the packaging apparatus may be an orbital packaging system such as those disclosed by U.S. Pat. Nos. 3,254,889, 3,599,705, or 3,842,568.

The tucking procedure in zone T is illustrated in greater detail in FIGS. 2A–2C. There, with the product drum 20 rotating in the direction of arrow 58, the leading seal bar assembly 36*f* moves toward the outer surface of drum 20 to clamp down fully onto film web 12. As shown by FIG. 2A, the trailing seal bar assembly 36*e* has not yet clamped the film. Tucking bar or roll 36*f* is just beginning to move toward the film web and recess 40*f*.

In FIG. 2B, tucking bar or roll 38*f* has tucked film web 12 into recess 40*f*, effectively providing a greater width of film from which a bag will be formed. The trailing seal bar assembly 38*e* has moved closer to the film web surface, but has still not clamped down fully.

In FIG. 2C, the trailing seal bar assembly 36*e* has clamped down on film web 12 and secured it against the surface of drum 20. Tucking bar or roll 38*f* is then moved out of recess 40*f*, leaving the additional width of film clamped between adjacent seal bar assemblies.

Figure 3:
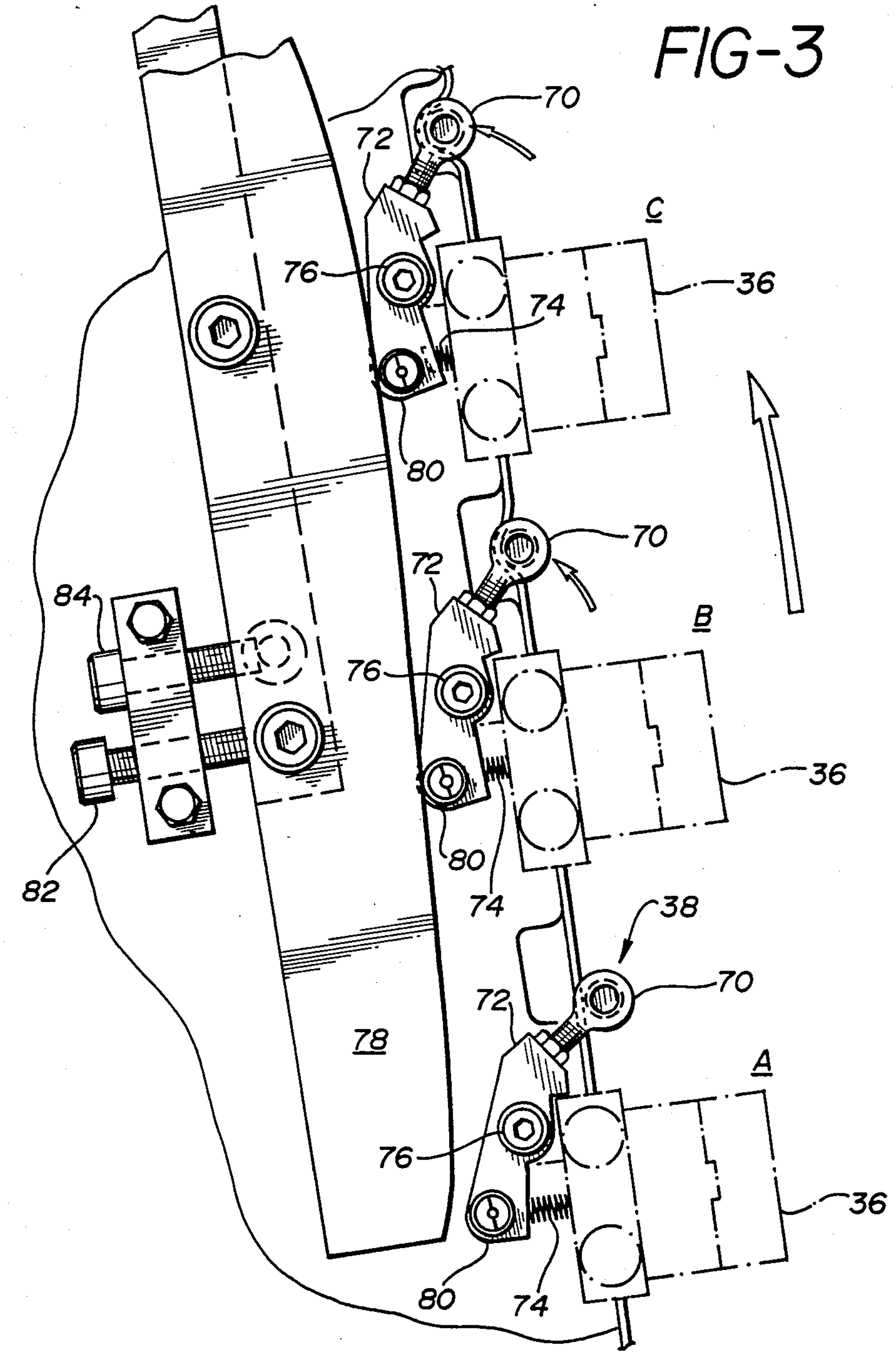
FIG. 3 is a side plan view of the operation of the tucking mechanism of the present invention.

Referring now to FIG. 3, the operation of seal bar assemblies 36 and tucking bars or rolls 38 is illustrated in further detail. For each of illustration, the various components are shown as converging along straight line paths. In actual practice, the seal bar assemblies and the drum surface converge along a nonlinear, curved path. Seal bar assembly 36 has mounted thereon a tucking roll 38.

Tucking roll 38 includes a rod end or bracket 70 with a bearing and having a generally circular cross-section which is mounted on a pair of pivoting rocker arms 72. As previously indicated, rod end 70 may be either rotatably mounted or mounted in a fixed position. If fixed, the surface of rod end 70 is preferably of a low friction material. Rocker arms 72 are mounted, in turn, on opposite ends of seal bar assembly 36. Tucking roll 38 extends longitudinally across the surface of drum 20. Rocker arms 72 are biased by springs 74 and pivot about point 76. An adjustable stationary cam 78 is mounted to the frame of bag making machine 10 on opposite sides of drum 20.

In operation, drum 20 rotates in the direction of the arrow. During this rotation, seal bar assembly 36 moves from positions A to C. In position A, seal bar assembly 36 is moving toward stationary cam 78. Cam follower 80 has not yet contacted the cam surface. In position B, cam follower 80 has contacted the surface of stationary cam 78, rocker arm 72 has pivoted slightly, and tucking roll 38 is tucking film web 12 into recess 40.

Finally, in position C, rod end 70 has traveled to its inward most point, and is ready to be withdrawn as cam follower 80 reaches the end of stationary cam 78. Preferably, stationary cam 78 may be designed to withdraw rod end 70 more quickly than it was moved into recess 40. As will be apparent to those skilled in this art, the movement of rod end 70 inwardly in an arc may be controlled to adjust the amount of tuck taken in the film web. This may be accomplished, for example, by making cam follower 80 adjustable with respect to stationary cam 78 such as by adjusting the position of pivot point 76 with respect to seal bar assembly 36. Alternatively, the amount of inward movement of rod end 70 may be controlled by adjusting the positioning of stationary cam 78. Cam 78 may be readily adjusted via adjustment screws 82 and 84 to in turn control the amount of travel of cam follower 80. Accordingly, bag making machine 10 may be readily converted to the production of bags having differing sizes.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An apparatus for the continuous production of bags from a folded web of thermoplastic material comprising:

a source of a continuous folded web of thermoplastic material;

a rotatable drum having a plurality of sever and seal stations located about the outer periphery thereof for forming individual bags, said sever and seal stations including means for clamping said web of thermoplastic material to the surface of the drum, said clamping means including a plurality of seal bar asssemblies sècured to an endless conveyor positioned adjacent said sever and seal stations;

means for continuously feeding said folded web of thermoplastic material onto the surface of said drum; and means mounted on adjacent sever and seal stations and positioned therebetween for tucking said web of material inwardly from the periphery of said drum to control the width of said bags, said tucking means being mounted on respective seal bar assemblies.

2. The apparatus of claim 1 in which said tucking means comprises a bar running laterally across the outer surface of said drum, a recess in said outer surface of said drum immediately beneath said bar, said bar actuated by a cam means for translating said bar from a position above said outer surface of said drum to a position urging said web into said recess.

3. The apparatus of claim 2 in which said cam means includes a cam surface, and a cam follower contacting said cam surface.

4. The apparatus of claim 3 in which said bar is mounted on a first end of a pair of rocker arms and said cam follower is mounted on the opposite end of said pair of rocker arms.

5. An apparatus for the continuous production of bags of differing widths from a folded web of thermoplastic material comprising:

- a rotatable drum having a plurality of sever and seal stations located above the outer periphery thereof for forming individual bags;
- a source of a continuous folded web of thermoplastic material;
- means for continuously feeding said folded web of thermoplastic material onto the surface of said drum;
- a plurality of means for clamping said web to the surface of said drum at each of said respective sever and seal stations, said clamping means including a plurality of seal bar assemblies secured to an endless conveyor positioned adjacent said sever and seal stations;
- means mounted on adjacent sever and seal stations and positioned therebetween for tucking said web of material inwardly from the periphery of said drum to control the width of said bags, said tucking means being mounted on respective seal bar assemblies; and
- means for transferring individual bags from said drum.

6. The apparatus of claim 5 in which said endless conveyor is driven from first and second sprockets located on opposite sides of said drum.

7. The apparatus of claim 5 in which said tucking means comprises a bar running laterally across the outer surface of said drum, a recess in said outer surface of said drum immediately beneath said bar, said bar actuated by a cam means for translating said bar from a position above said outer surface of said drum to a position urging said web into said recess.

8. The apparatus of claim 7 in which said cam means includes a cam surface, and a cam follower contacting said cam surface.

9. The apparatus of claim 7 in which said bar has a low friction surface.

10. The apparatus of claim 8 in which said cam means is adjustable to control the distance said roll is translated into said recess.

11. The apparatus of claim 8 in which the position of said cam surface is fixed and the position of said cam follower is adjustable to control the distance said bar is translated into said recess.

12. The apparatus of claim 5 in which said tucking means comprises a rotatably-mounted roll running across the outer surface of said drum, a recess in said outer surface of said drum immediately beneath said roll, said roll actuated by a cam means for translating said roll from a position above said outer surface of said drum to a position urging said web into said recess.

13. The apparatus of claim 12 in which said cam means includes a cam surface, and a cam follower contacting said cam surface.

14. The apparatus of claim 13 in which said cam means is adjustable to control the distance said roll is translated into said recess.

15. The apparatus of claim 13 in which the position of said cam surface is fixed and the position of said cam follower is adjustable to control the distance said roll is translated into said recess.

* * * * *

UNITED STATES PATENT AND TRADEMARK OFFICE
CERTIFICATE OF CORRECTION

PATENT NO. : 4,902,374

DATED : February 20, 1990

INVENTOR(S) : David A. Smith, Herbert B. Geiger, and R. Douglas Behr

It is certified that error appears in the above-identified patent and that said Letters Patent is hereby corrected as shown below:

On the title page, after U.S. PATENT DOCUMENTS 4,702,731 10/1987 Lambrecht et al., insert --FOREIGN PATENT DOCUMENTS 1,054,644 3-3-64 British Meulen--.

Column 1, line 41, "for" should correctly appear as --by--.

Column 2, line 9, "truck" should correctly appear as --tuck--.

Column 2, line 41, "protection" should correctly appear as --production--.

Column 3, line 43, "view" should correctly appear as --view,--.

Column 4, line 22, "peripheray" should correctly appear as --periphery--.

Column 5, line 59, "each" should correctly appear as --ease--.

Column 7, line 18, "above" should correctly appear as --about--.

Signed and Sealed this

Twenty-sixth Day of March, 1991

*Attest:*

HARRY F. MANBECK, JR.

*Attesting Officer*

*Commissioner of Patents and Trademarks*